(12) United States Patent
Hull et al.

(10) Patent No.: US 6,179,634 B1
(45) Date of Patent: Jan. 30, 2001

(54) FLOOR BOX COVER ASSEMBLY

(75) Inventors: Eric G. Hull, Madison; Charles H. Riedy, Lakewood; Dennis P. Revlock, Sr., Eastlake, all of OH (US)

(73) Assignee: The Lamson & Sessions Co., Cleveland, OH (US)

(*) Notice: Under 35 U.S.C. 154(b), the term of this patent shall be extended for 0 days.

(21) Appl. No.: 09/397,403

(22) Filed: Sep. 16, 1999

(51) Int. Cl.[7] .................................................. H01R 13/44
(52) U.S. Cl. ............................ 439/142; 439/536; 174/48
(58) Field of Search ........................... 439/142, 136, 439/535, 536, 538, 544, 548, 925; 174/67, 48

(56) References Cited

U.S. PATENT DOCUMENTS

| | | | |
|---|---|---|---|
| 2,672,749 | 3/1954 | Wiesmann | 52/220.4 |
| 3,343,704 | 9/1967 | Terry | 220/3.4 |
| 3,646,244 | 2/1972 | Cole | 174/57 |
| 3,666,134 | 5/1972 | Rauch | 220/31 R |
| 4,058,358 | 11/1977 | Carlisle | 439/142 |
| 4,197,959 | 4/1980 | Kramer | 220/242 |
| 4,228,317 | * 10/1980 | Cziment | 439/142 |
| 4,289,921 | * 9/1981 | Gartner et al. | 439/48 |
| 4,342,493 | 8/1982 | Grenell | 439/142 |
| 4,874,906 | 10/1989 | Shotey | 174/67 |
| 5,148,348 | 9/1992 | White | 361/356 |
| 5,240,426 | 8/1993 | Barla | 439/136 |
| 5,272,278 | 12/1993 | Wuertz | 174/48 |
| 5,306,178 | 4/1994 | Huang | 439/536 |
| 5,571,023 | * 11/1996 | Anthony | 439/142 |
| 5,650,591 | 7/1997 | Matsushita et al. | 439/17 |
| 5,743,752 | 4/1998 | Massebeuf | 439/142 |

* cited by examiner

Primary Examiner—T. C. Patel
(74) Attorney, Agent, or Firm—Jones, Day, Reavis & Pogue

(57) ABSTRACT

A cover assembly for a floor box includes a ring, a cover, and a gasket. The ring is configured to support an electrical receptacle within an open upper end portion of the floor box. The cover has an access opening for providing access to the receptacle, and has an access door for closing the access opening. The ring, the cover and the gasket are configured for interconnection in installed positions in which a portion of the gasket is deflected into an annular configuration interposed radially between the ring and the cover. When the gasket is thus installed between the ring and the cover, the edge portion of the gasket establishes a seal that surrounds the access opening in the cover. Additionally, the cover has apertures for receiving fasteners that interconnect the ring, the cover, and the gasket in their installed positions. The access door is configured to overlie all of those apertures, and thereby to conceal all of those fasteners from view, when the door is in a closed position.

11 Claims, 3 Drawing Sheets

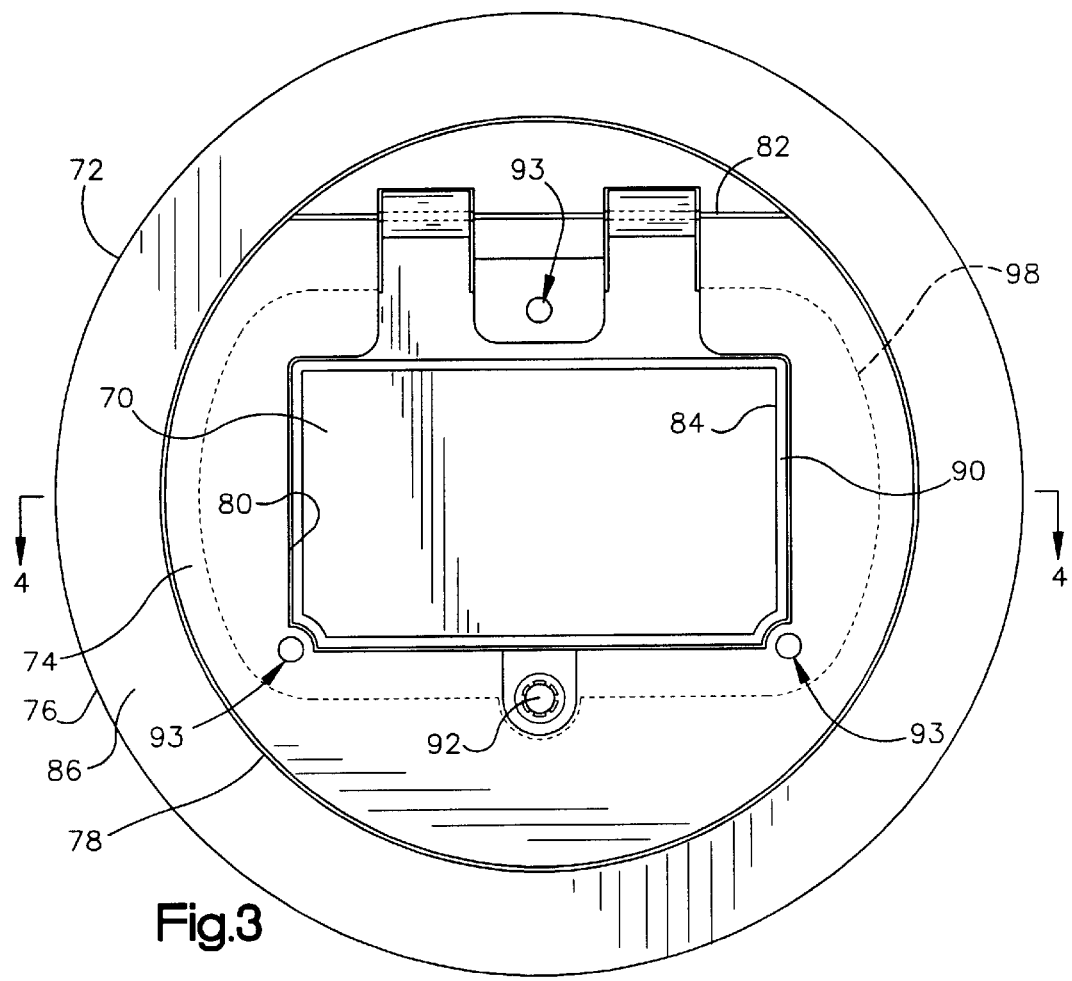
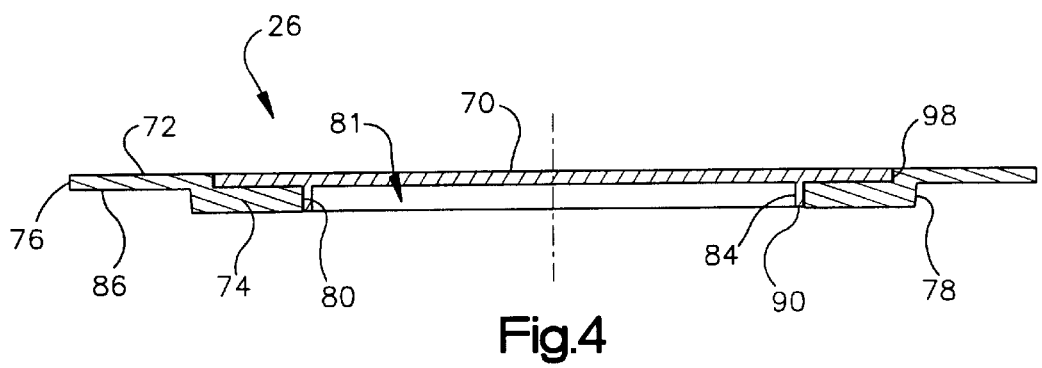

FLOOR BOX COVER ASSEMBLY

BACKGROUND OF THE INVENTION

The present invention relates to cover assemblies for floor mounted electrical receptacles.

A floor mounted electrical receptacle is typically contained in a structure known as a floor box. Electrical power lines are routed upward to the receptacle through an open lower end of the floor box. A cover assembly at the floor surface conceals the floor box from view. The cover assembly has an access door that can be opened to provide access to the receptacle in the floor box.

SUMMARY OF THE INVENTION

The present invention is an apparatus for use with an electrical receptacle and a floor box. In accordance with a principal feature of the invention, the apparatus comprises a ring, a cover, and a gasket. The ring is configured to support the receptacle within an open upper end portion of the floor box. The cover has an access opening for providing access to the receptacle, and has an access door for closing the access opening. The ring, the cover and the gasket are configured for interconnection in installed positions in which a portion of the gasket is deflected into an annular configuration interposed radially between the ring and the cover. When the gasket is thus installed between the ring and the cover, the annular portion of the gasket establishes a seal that surrounds the access opening in the cover.

In accordance with another principal feature of the invention, the cover is circular and has a peripheral edge portion that projects radially outward from the floor box fully around the circumference of the floor box. The cover further has apertures for receiving fasteners that fasten the cover in its installed position. The door is configured to overlie all of those apertures, and thereby to conceal all of the corresponding fasteners from view, when the door is in a closed position.

BRIEF DESCRIPTION OF THE DRAWINGS

FIG. 3 is a bottom view of a part shown in FIG. 2; and

FIG. 4 is a view taken on line 4—4 of FIG. 3.

DESCRIPTION OF A PREFERRED EMBODIMENT

Figure 1:
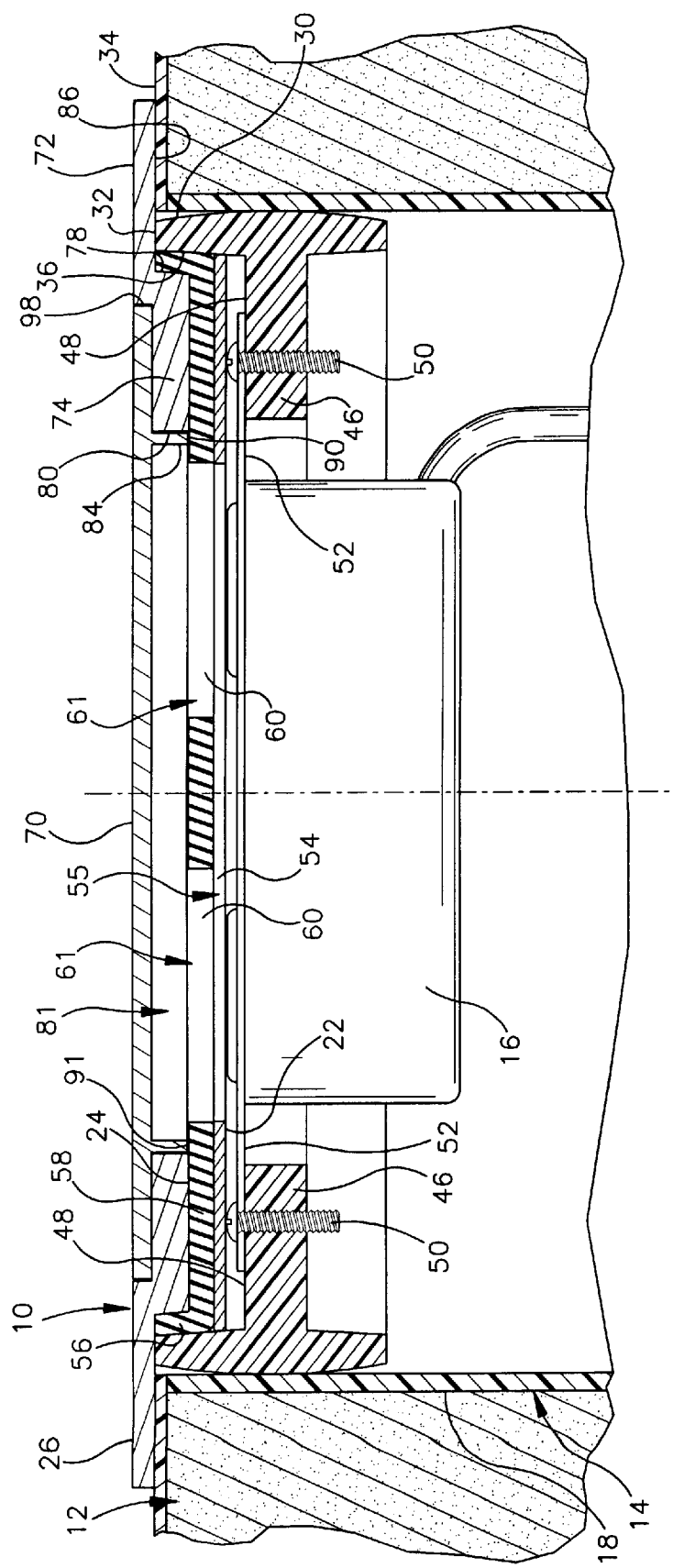
FIG. 1 is a side sectional view of an apparatus comprising a preferred embodiment of the present invention.

A cover assembly 10 comprising a preferred embodiment of the present invention is shown in FIG. 1. The cover assembly 10 includes a plurality of interconnected parts that are shown separately in FIG. 2. Also shown in FIG. 1 is a concrete floor 12, a cylindrical floor box 14 embedded in the floor 12, and an electrical receptacle 16. When the separate parts of the cover assembly 10 are interconnected and installed as shown in FIG. 1, they support the receptacle 16 within the upper end portion 18 of the floor box 14.

The separate parts of the cover assembly 10 (FIG. 2) include an adapter ring 20, a backing plate 22, a gasket 24 and a cover 26. The ring 20 is preferably formed of an electrically nonconductive material, and is most preferably formed as a one-piece plastic structure. As known in the art, a generally cylindrical outer surface 30 of the ring 20 is bowed radially outward. This facilitates placement of the ring 20 in the floor box 14 in a position in which an annular upper end surface 32 of the ring 20 is level. A generally cylindrical inner surface 36 of the ring 20 has a slightly tapered contour extending radially inward from the upper end surface 32.

Figure 2:
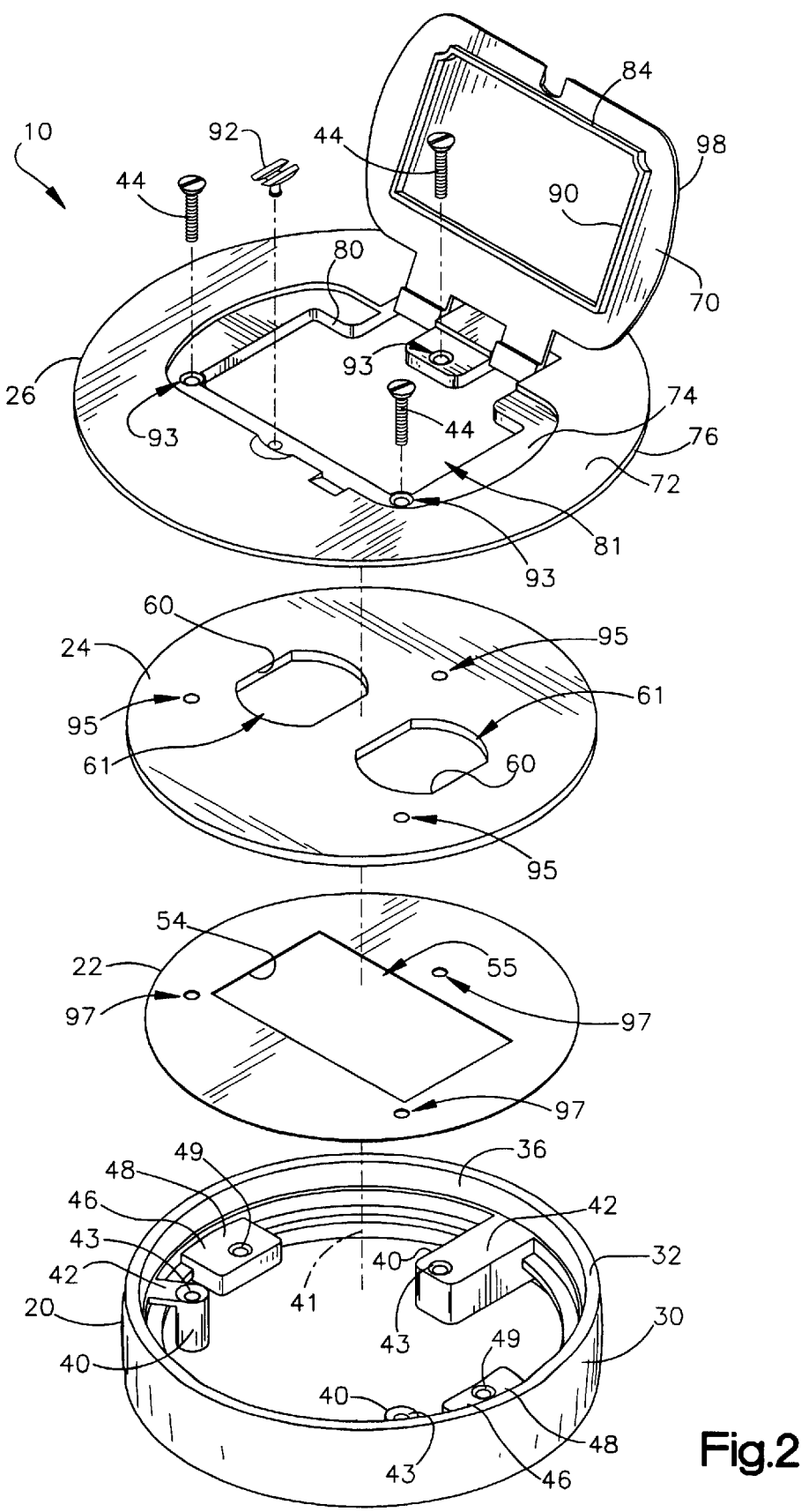
FIG. 2 is an exploded view of parts of the apparatus of FIG. 1.

The ring 20 has three plate support portions 40 (FIG. 2). The plate support portions 40 of the ring 20 project radially inward at locations that are evenly spaced apart circumferentially about the central axis 41 of the ring 20. The plate support portions 40 have coplanar upper surfaces 42, and each has a bore 43 for receiving a corresponding fastener 44. These fasteners 44 interconnect the separate parts of the floor cover assembly 10.

The ring 20 further has a pair of receptacle support portions 46 projecting radially inward at diametrically opposite locations. The receptacle support portions 46 of the ring 20 have coplanar upper surfaces 48 that are spaced axially downward from the surfaces 42. Each has a bore 49 for receiving a corresponding fastener 50 (FIG. 1). Those fasteners 50 connect the receptacle 16 to the ring 20. More specifically, a pair of mounting tabs 52 at the opposite ends of the receptacle 16 rest on the surfaces 48. The fasteners 50 attach the tabs 52 to the receptacle support portions 46 of the ring 20, as shown in FIG. 1.

The backing plate 22 is preferably formed of galvanized steel, and has a circular peripheral shape with a diameter just slightly less than the diameter of the cylindrical inner surface 36 of the ring 20. The backing plate 22 is thus receivable closely within the ring 20, as shown in FIG. 1, in an installed position in which it rests on the upper surfaces 42 (FIG. 2) of the plate support portions 40 of the ring 20. An inner edge surface 54 of the backing plate 22 defines a rectangular opening 55 for providing access to the receptacle 16.

The gasket 24 also has a circular peripheral shape. However, the diameter of the gasket 24 is substantially greater than the diameters of the backing plate 22 and the cylindrical inner surface 36 of the ring 20. The gasket 24 is thus receivable within the ring 20 in a deflected condition in which an annular peripheral edge portion 56 of the gasket 24 projects axially from a major central portion 58, as shown in FIG. 1. This is described more fully below with reference to interconnection of the cover 26 with the other parts of the assembly 10.

A pair of inner edge surfaces 60 of the gasket 24 define a pair of access openings 61 for access to the receptacle 16. Although the gasket 24 in the preferred embodiment of the invention has two access openings 61 for the duplex receptacle 16, one or more differently configured access openings could be used to provide access to a correspondingly different receptacle in an alternative embodiment of the invention. The gasket 24 is preferably formed of rubber, but could be formed of any other material suitable for such a gasket.

The cover 26 includes a door 70 and a floor plate 72. Both the door 70 and the floor plate 72 are preferably formed of brass. As best shown in FIGS. 3 and 4, the floor plate 72 has a short, generally cylindrical central portion 74 and a wide, ring-shaped peripheral edge portion 76. The peripheral edge portion 76 of the floor plate 72 is large enough to project radially outward from the floor box 14 (FIG. 1) fully around the circumference of the floor box 14 when the cover assembly 10 is installed. The central portion 74 of the floor plate 72 has a generally cylindrical outer surface 78 at the lower side of the cover 26. The outer surface 78 on the cover 26 has a tapered contour corresponding to the tapered contour of the inner surface 36 on the ring 20, but has a lesser diameter. An inner edge surface 80 of the cover 26 defines a generally rectangular access opening 81 (FIG. 1) for providing access to the receptacle 16.

A hinge pin 82 (FIG. 3) supports the door 70 on the floor plate 72 for movement pivotally between an open position, as shown in FIG. 2, and a closed position, as shown in FIGS. 3 and 4. An endless rib 84 at the lower side of the door 70 projects into the access opening 81 alongside the inner edge surface 80 when the door 70 is closed.

As further shown in FIG. 1, the cover 26 is received over the ring 20 in an installed position concentric with the ring 20. A lower side surface 86 of the floor plate 72 rests on the upper end surface 32 of the ring 20. The central portion 74 of the floor plate 72 is received concentrically within the ring 20, with the cylindrical outer surface 78 facing radially outward toward the cylindrical inner surface 36. The cover 26 is moved axially downward to this position upon tightening of the fasteners 44 (FIG. 2).

The gasket 24, which is first placed loosely between the cover 26 and the ring 20, is deflected into the configuration of FIG. 1 under the clamping force applied by the fasteners 44 upon movement of the cover 26 axially downward. Specifically, the annular peripheral edge portion 56 of the gasket 24 is captured radially between the opposed cylindrical surfaces 78 and 36 as the cover 26 pushes the central portion 58 of the gasket 24 downward toward and against the backing plate 22. The tapered contours of those surfaces 78 and 36 in the preferred embodiment help to avoid the formation of a sharp edge at which the edge portion 56 of the gasket 24 could tear apart from the central portion 58. The edge portion 56 of the gasket 24 is then retained tightly between the opposed cylindrical surfaces 78 and 36 circumferentially entirely around the central portion 74 of the floor plate 72 under the clamping force applied by the fasteners 44. The edge portion 56 of the gasket 24 is thus interposed between the cover 26 and the ring 20 to provide a seal surrounding the access opening 81 in the floor plate 72. This seal provides protection from the ingress of numerous types of solid or liquid materials, and may be referred to as a scrub water seal.

As further shown in FIGS. 3 and 4, the rib 84 at the lower side of the door 70 has a lower edge surface 90. When the door 70 is moved to the closed position, as shown in FIG. 1, the lower edge surface 90 of the rib 84 moves into abutment with a coextensive upper surface portion of the gasket 24 to establish an additional scrub water seal at that location. A quarter-turn fastener 92 (FIG. 2) is preferably used to hold the door 70 in the closed position.

An additional feature of the invention is shown in FIGS. 2 and 3. The fasteners 44 are received through apertures 93 in the central portion 74 of the floor plate 72. Those apertures 93 are aligned with corresponding apertures 95 and 97 in the gasket 24 and the backing plate 22, respectively, and are further aligned with the bores 43 in the plate support portions 40 of the ring 20. As shown in FIG. 3, when the door 70 is in the closed position, the peripheral edge surface 98 of the door 70 is spaced outward of the apertures 93 in the floor plate 72. The door 70 is thus configured to cover all of the apertures 93, and thereby to conceal all of the fasteners 44 from view, when the door 70 is in the closed position.

The invention has been described with reference to a preferred embodiment. Those skilled in the art will perceive improvements, changes and modifications as taught by the foregoing description. Such improvements, changes and modifications are intended to be within the scope of the claims.

We claim:

1. Apparatus for use with an electrical receptacle and a floor box, said apparatus comprising:
    a ring configured to support the receptacle within an open upper end portion of the floor box;
    a cover having an access opening for providing access to the receptacle, said cover further having an access door for closing said access opening; and
    a gasket;
    said ring, said cover and said gasket being configured for interconnection in installed positions in which a portion of said gasket is deflected into an annular configuration interposed radially between said ring and said cover to establish a seal surrounding said access opening.

2. Apparatus as defined in claim 1 wherein said portion of said gasket is a peripheral edge portion which is clamped between radially opposed cylindrical surface portions of said ring and said cover when said ring, said cover and said gasket are interconnected in said installed positions.

3. Apparatus as defined in claim 2 wherein said ring has a generally cylindrical inner surface portion with a first diameter, said cover has a lower side structure with a generally cylindrical outer surface portion having a second diameter less than first diameter, and said gasket, when in an uninstalled condition, has a circular peripheral shape with a third diameter greater than said first and second diameters.

4. Apparatus as defined in claim 3 further comprising a backing plate, said backing plate being receivable within said ring such that a portion of said gasket is clamped axially between said backing plate and said lower side structure on said cover when said ring, said cover and said gasket are interconnected in said installed positions.

5. Apparatus as defined in claim 4 wherein said backing plate has a circular peripheral shape with a fourth diameter between said first and second diameters.

6. Apparatus as defined in claim 1 wherein said door includes a lower side structure comprising an endless rib configured to project through said access opening alongside the periphery of said access opening when said door is in a closed position, said rib having a lower end surface configured to adjoin a coextensive upper surface portion of said gasket when said door is in said closed position, whereby said gasket establishes an additional seal extending endlessly alongside said periphery of said access opening.

7. Apparatus as defined in claim 1 wherein said cover has apertures for receiving fasteners that interconnect said ring, said cover and said gasket in said installed positions, said door being configured to overlie all of said apertures, and thereby to conceal all of said fasteners from view, when said door is in a closed position.

8. Apparatus for use with an electrical receptacle and a floor box, said apparatus comprising:
    a circular floor plate having a peripheral edge portion configured to project radially outward from the floor box fully around the circumference of the floor box when said floor plate is received over the floor box in an installed position, said floor plate further having an access opening for providing access to the receptacle and apertures for receiving fasteners that fasten said floor plate in said installed position;
    an access door for closing said access opening, said door being configured to overlie all of said apertures, and thereby to conceal all of said fasteners from view, when said door is in a closed position; and
    a gasket;
    said door including a lower side structure comprising an endless rib configured to project through said access opening into abutment with said gasket alongside the periphery of said access opening when said door is in a closed position, whereby said gasket establishes a seal extending endlessly alongside said periphery of said access opening.

9. Apparatus as defined in claim 8 further comprising a backing plate configured for interconnection with said floor plate and said gasket in an installed position in which a portion of said gasket is clamped axially between said backing plate and said floor plate.

10. Apparatus for use with an electrical receptacle and a floor box, said apparatus comprising:

a floor plate having a peripheral edge portion configured to project outward from the floor box fully around the periphery of the floor box when said floor plate is received over the floor box in an installed position, said floor plate further having an access opening for providing access to the receptacle and apertures for receiving fasteners that fasten said floor plate in said installed position;

an access door for closing said access opening, said door being configured to overlie all of said apertures, and thereby to conceal all of said fasteners from view, when said door is in a closed position; and a gasket;

said door including a lower side structure comprising an endless rib configured to project through said access opening into abutment with said gasket alongside the periphery of said access opening when said door is in a closed position, whereby said gasket establishes a seal extending endlessly alongside said periphery of said access opening.

11. Apparatus as defined in claim 10 further comprising a backing plate configured for interconnection with said floor plate and said gasket in an installed position in which a portion of said gasket is clamped axially between said backing plate and said floor plate.

* * * * *